United States Patent [19]

Wagner

[11] Patent Number: 4,555,163

[45] Date of Patent: Nov. 26, 1985

[54] COMPLEMENTARY COLOR SPLITTING FILTERS USED IN A COLOR CAMERA

[75] Inventor: Theodor M. Wagner, Princeton, N.J.

[73] Assignee: RCA Corporation, Princeton, N.J.

[21] Appl. No.: 534,710

[22] Filed: Sep. 22, 1983

[51] Int. Cl.[4] .................. G02B 27/10; G02B 5/28; H04N 9/09

[52] U.S. Cl. .................... 350/172; 350/173; 350/166; 358/55

[58] Field of Search ............... 350/172, 171, 173, 166, 350/164; 358/55; 354/103, 104

[56] References Cited

U.S. PATENT DOCUMENTS 3,002,051 9/1961 Tait ........................................ 358/55
3,410,626 11/1968 Magrath ............................. 350/166

Primary Examiner—Jon W. Henry
Attorney, Agent, or Firm—Eugene M. Whitacre; Henry I. Steckler; Lawrence C. Edelman

[57] ABSTRACT

A color beam splitter splits the incoming light into complementary colors such as yellow, magenta, and cyan for improved colorimetry. Stripes are used so that no light is absorbed and therefore a high S/N ratio is achieved. The stripes can be on mirrors or prisms.

10 Claims, 3 Drawing Figures

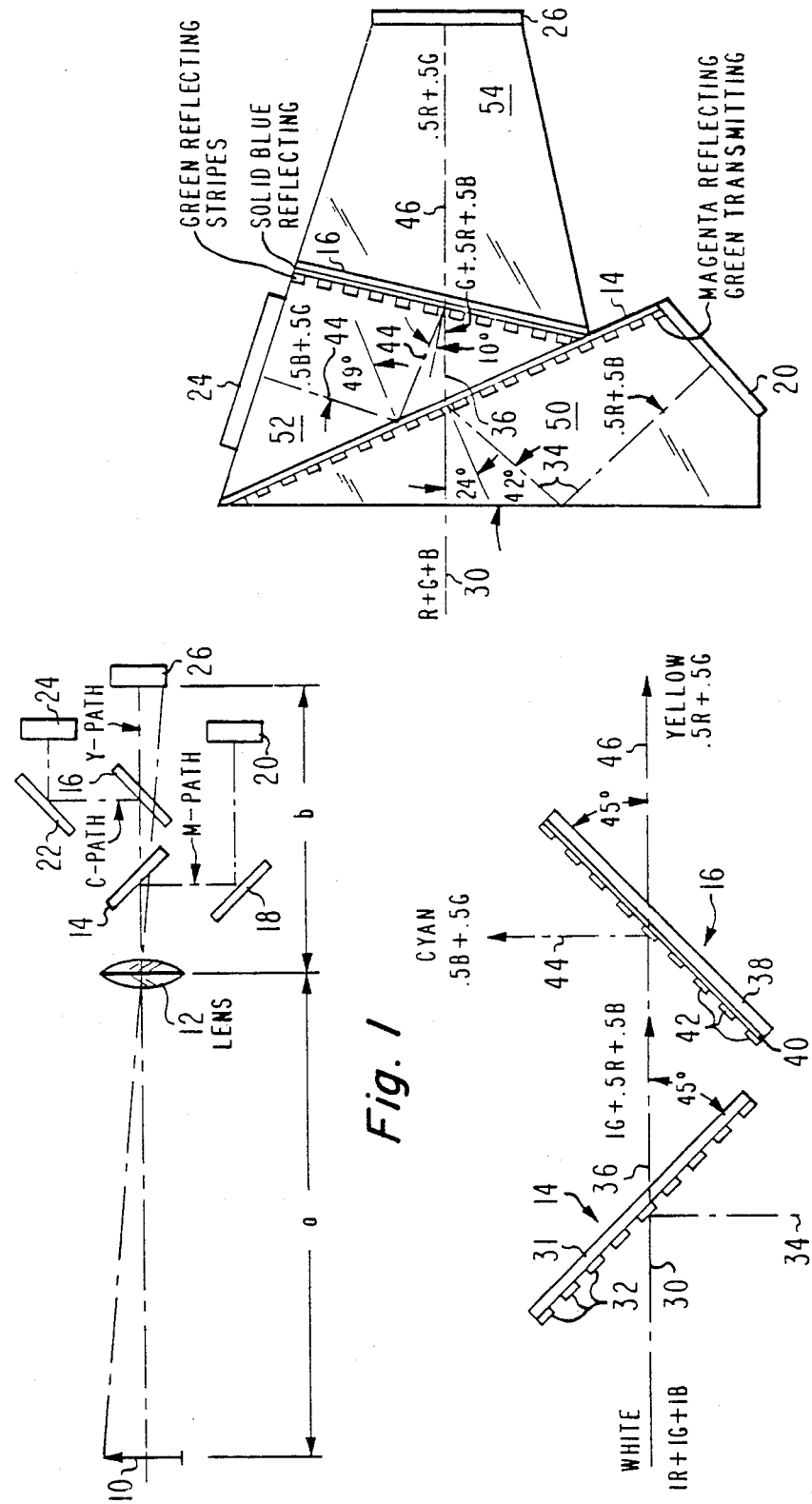

COMPLEMENTARY COLOR SPLITTING FILTERS USED IN A COLOR CAMERA

BACKGROUND OF THE INVENTION

The present invention relates to color splitting filters for a television camera, and more particularly to such filters that provide three output light colors that are complementary to the prior art red, blue, and green primary colors respectively.

The standard prior art color camera uses a beam splitter, such as dichroic mirrors or a prism, to respectively provide R (red), B (blue), and G (green) color output light beams to three imagers, such as vidicons or CCD (charge coupled device) imagers. For best colorimetry, the ideal R, G, and B filters require negative lobes at certain wavelengths, which lobes are not physically realizable. As a result, practical cameras use taking characteristics (spectral responses) that are designed so that negative lobes are not required. The design process for the filters is an optimization process to minimize color errors. Further reduction of color errors is possible by matrixing; however this lowers the signal-to-noise ratio, which lowering is proportionally greater for the B channel due to the low luminosity of blue and to the generally low sensitivity of the B sensor.

It is therefore desirable to have a camera that has both improved colorimetry and improved signal-to-noise ratio.

SUMMARY OF THE INVENTION

A color beam splitter for use with incident light comprising a first partially reflecting means having first areas for transmitting said light along a path and second areas for reflecting a first complementary color; and a second partially reflecting means disposed in said path and having first areas transmitting a second complementary color and second areas for reflecting a third complementary color.

DESCRIPTION OF THE DRAWINGS

FIG. 1 shows a first embodiment of the invention using mirrors;

FIG. 2 shows details of the mirrors of FIG. 1; and

FIG. 3 shows a second embodiment using a prism.

DETAILED DESCRIPTION

FIG. 1 shows an object 10 (indicated by an arrow) that it will be assumed reflects white (W) light from ambient lighting. Lens 12 focuses the light in accordance with the lens equation:

$$1/f = 1/a + 1/b$$

wherein f=focal length of lens 10, a=distance from object 10 to lens 12, and b=distance from lens 12 to the Ye (yellow) sensor (described below).

After emerging from lens 12 the light is partially transmitted by mirror 14 to mirror 16 and the magenta (M) component is partially reflected by mirror 14 to mirror 18. Mirror 18 is a totally reflecting type and is used to properly orient the image on M imager 20 due to an inversion caused by mirror 14. The transmitted light from mirror 14, which lacks the M component, has its cyan (C) component reflected by mirror 16 to inverting mirror 22, and then to C imager 24. The remaining yellow (Y) component is transmitted by mirror 16 and images onto Y imager 26. The signals from imagers 20, 24, and 26 are processed, e.g. clamped, matrixed, etc. as known in the art.

FIG. 2 shows details of the mirrors 14 and 16. Mirror 14 is oriented at a 45 degree angle to the incident light 30, which is assumed to be white (1R+1B1G). Mirror 14 comprises a transparent substrate 31 having a series of closely spaced parallel stripes 32 of 50 percent "duty cycle" thereon, i.e. stripes 32 cover one-half the area of mirror 14. Stripes 32 transmit green wavelengths of about 520 to 580 nm and reflect magenta (R+B) from 400 to 520 nm and 580 to 700 nm. Thus reflected beam 34 comprises a magenta beam of amplitude 0.5R+0.5B due to the 50 percent duty cycle, while transmitted beam 36 comprises the remaining light of amplitude 1G+0.5R+0.5B.

Mirror 16 is oriented at a 45 degree angle to beam 36 and 90 degrees to mirror 14. Mirror 16 comprises a transparent substrate 38 having a blue reflecting (wavelengths less than about 490 nm), red and green transmitting layer 40 disposed thereon. Stripes 42 are disposed on top of layer 40 and have a 50 percent duty cycle. Stripes 32 and 42 can have the same stripe frequency and angular orieintation with respect to the center of beams 30 and 36. Stripes 42 reflect green light (about 520 to 580 nm) and transmit blue and red light. The stripe pitch or stripe frequency of stripes 32 and 42 should be fine enough so as not to cause aliasing in the transmission channel. For example, a stripe frequency of at least 540 line pairs per inch is sufficient for a one inch sensor having a 0.5 inch image width and a 4:3 aspect ratio for 5 MHz bandwidth. The stripe frequency itself has no effect on the basic dichroic filter design. The reflected light beam 44 thus comprises all of the blue component of beam 36 (0.5B) and one-half (due to the 50 percent duty cycle) of the green component (G) thereof. Thus beam 44 comprises 0.5B+0.5G or cyan. Transmitted beam 46 comprises all of the red component of beam 36 (0.5R) and one-half of the green component not reflected by stripes 42. Thus beam 46 comprises 0.5R and 0.5G or yellow.

It will be seen that essentially all of the light in incident beam 30 is used, i.e. no absorption or dissipative filtering is used, which results in a high S/N.

The embodiment of FIG. 2 may have a shift in the spectral transmission characteristic of the filter when the incident beam is polarized due to the large angles of incidence. The embodiment shown in FIG. 3, wherein corresponding elements have been given corresponding reference numerals, avoids this possible problem. In FIG. 3 mirrors 14 and 16 are mounted between prisms 50 and 52, and 52 and 54, respectively. It will be seen that incoming beam 30 makes an angle of only 24 degrees with surface 14 and transmitted beam 36 has an angle of only 10 degrees with surface 16, thereby minimizing filter transmission characteristic shifts. Also, quarter-wavelength plates can be used on the front face of prism 50 to minimize wavelength shifts due to polarized light as known in the art. Imagers 20 and 24 are mounted on prisms 50 and 52 respectively as shown in U.S. Pat. No. 4,323,918. Color correcting filters can be used as known in the art.

It will be appreciated that many other embodiments are possible within the spirit and scope of the invention. For example instead of stripes other area sharing patterns, such as a checkboard pattern, can be used. Also duty cycles other than 50 percent can be used. Still further a complementary color other than magenta can be splitt off first from the incident beam 30 and yellow does not have to be the residual complementary color in beam 46. In general, there are six possible ways of splitting the beam 30 into the three complementary colors of yellow, cyan, and magenta, which colors are complementary to the prior art blue, red, and green colors respectively. By "complementary" is meant that two colors when added together make white, e.g. red and cyan make white, as do green and magenta, and also blue and yellow.

What is claimed is:

1. A color television beam splitter for use with incident light including first, second and third primary color components comprising a first partially reflecting means having first areas for transmitting all of said incident light components along a path and second areas for reflecting all of a first group of two of said three primary color components corresponding to a first color complementary to said first primary color component to a first output port; and a second partially reflecting means disposed in said path and having first areas for transmitting all of a second group of two of said three primary color components corresponding to a second color complementary to said second primary color component to a second output port and second areas for reflecting all of a third group of two of said three primary color components corresponding to a third color complementary to said third primary color component to a third output port.

2. A splitter as claimed in claim 1, wherein each of said first and second means comprises a mirror having an area sharing reflective pattern.

3. A splitter as claimed in claim 2, wherein said reflective pattern comprises reflective stripes.

4. A splitter as claimed in claim 2, wherein each of said first and second means comprises a prism having an area sharing reflective pattern.

5. A splitter as claimed in claim 2, wherein said pattern comprises stripes.

6. A splitter as claimed in claim 2, wherein said pattern has a 50 percent duty cycle.

7. A splitter as claimed in claim 4, wherein said pattern has a 50 percent duty cycle.

8. A splitter as claimed in claim 1, wherein said first, second and third primary color components respectively comprise green, blue and red and said first, second and third complementary color components respectively comprise magenta, yellow, and cyan.

9. A splitter as claimed in claim 1, further comprising a plurality of imagers disposed proximate said first and second means.

10. A color television beam splitter for use with incident light including red, green and blue primary color components, comprising a first partially reflecting means comprising a first layer having a light transmissive characteristic which transmits all of said primary color components of said incident light along a path and a second layer overlying selective areas of said first layer, having a light transmissive characteristic which transmits substantially all of a first of said primary color components along said path and reflects substantially all of the remaining two of said primary color components to a first output port, and a second partially reflecting means comprising a first layer having a light transmissive characteristic which reflects substantially all of a second of said primary color components to a second output port and transmits substantially all of the remaining two primary color components to a third output port and a second layer overlying selective areas of said first layer having a light transmissive characteristic which reflects substantially all of said first primary color component to said second output port and transmits substantially all of the remaining two primary color components to said third output port, wherein color components complementary to said red, green and blue primary color components are developed at said first, second and third outputs, respectively.

* * * * *